(12) United States Patent
Kulas

(10) Patent No.: US 11,678,008 B2
(45) Date of Patent: *Jun. 13, 2023

(54) MOVING VIDEO TAGS

(71) Applicant: Gula Consulting Limited Liability Company, Dover, DE (US)

(72) Inventor: Charles J. Kulas, San Francisco, CA (US)

(73) Assignee: Gula Consulting Limited Liability Company, Dover, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 17/229,240

(22) Filed: Apr. 13, 2021

(65) Prior Publication Data

US 2021/0235151 A1 Jul. 29, 2021

Related U.S. Application Data

(63) Continuation of application No. 16/799,575, filed on Feb. 24, 2020, now Pat. No. 10,979,760, which is a
(Continued)

(51) Int. Cl.
*H04N 21/431* (2011.01)
*H04N 21/4782* (2011.01)
(Continued)

(52) U.S. Cl.
CPC ..... *H04N 21/4316* (2013.01); *H04N 21/4312* (2013.01); *H04N 21/4314* (2013.01); *H04N 21/440272* (2013.01); *H04N 21/4622* (2013.01); *H04N 21/47* (2013.01); *H04N 21/4722* (2013.01); *H04N 21/4782* (2013.01); *H04N 7/0122* (2013.01)

(58) Field of Classification Search
None
See application file for complete search history.

(56) References Cited

U.S. PATENT DOCUMENTS

| 5,680,532 A | 10/1997 | Amakawa et al. |
| 5,929,849 A * | 7/1999 | Kikinis ............... H04N 21/4622 348/E7.071 |

(Continued)

FOREIGN PATENT DOCUMENTS

| WO | WO-2007115224 A2 * | 10/2007 | ........... G01S 13/878 |
| WO | WO-2007130472 A2 * | 11/2007 | ............... A23L 2/52 |

OTHER PUBLICATIONS

Third party, Alleged invalidity claim chart for U.S. Pat. No. 9,906,829.
(Continued)

*Primary Examiner* — Ricky Chin

(57) ABSTRACT

A method causes a display device to display a video depicting an item in a scene and a tag in a first position on a first frame of the video. The tag is associated with the item depicted in the video, and the tag includes text information associated with the item depicted in the video. The method causes the video display to display the tag in a second position on a second frame of the video and causes the video display to display the tag in intermediate positions between the first and second positions during frames between the first and second frames of the video.

18 Claims, 5 Drawing Sheets

Related U.S. Application Data continuation of application No. 16/253,597, filed on Jan. 22, 2019, now Pat. No. 10,575,044, which is a continuation of application No. 15/907,095, filed on Feb. 27, 2018, now Pat. No. 10,187,688, which is a continuation of application No. 15/269,701, filed on Sep. 19, 2016, now Pat. No. 9,906,829, which is a continuation of application No. 12/172,185, filed on Jul. 11, 2008, now Pat. No. 9,451,195.

(60) Provisional application No. 60/949,505, filed on Jul. 12, 2007.

(51) Int. Cl.
    *H04N 21/4722*     (2011.01)
    *H04N 21/4402*     (2011.01)
    *H04N 21/462*     (2011.01)
    *H04N 21/47*     (2011.01)
    *H04N 7/01*     (2006.01)

(56) References Cited

U.S. PATENT DOCUMENTS

| | | | |
|---|---|---|---|
| 5,987,509 A * | 11/1999 | Portuesi | H04N 21/4722 725/113 |
| 6,493,872 B1 | 12/2002 | Rangan et al. | |
| 6,546,405 B2 | 4/2003 | Gupta et al. | |
| 6,580,870 B1 * | 6/2003 | Kanazawa | H04N 21/4143 386/244 |
| 7,027,101 B1 | 4/2006 | Sloo et al. | |
| 7,133,837 B1 | 11/2006 | Barnes, Jr. | |
| 7,224,401 B2 | 5/2007 | Ackley et al. | |
| 7,343,561 B1 | 3/2008 | Stochosky et al. | |
| 7,487,112 B2 | 2/2009 | Barnes, Jr. | |
| 7,796,155 B1 * | 9/2010 | Neely, III | G06V 20/52 348/157 |
| 7,933,809 B2 * | 4/2011 | Abraham | H04N 21/4722 705/26.1 |
| 8,073,830 B2 * | 12/2011 | Fontes | G06F 16/951 707/706 |
| 8,285,121 B2 * | 10/2012 | Kulas | H04N 21/4788 386/326 |
| 8,412,021 B2 * | 4/2013 | Kulas | H04N 9/87 386/245 |
| 8,640,030 B2 | 1/2014 | Kulas | |
| 8,656,282 B2 | 2/2014 | Kulas | |
| 9,008,491 B2 * | 4/2015 | Kulas | G11B 27/34 386/239 |
| 9,451,195 B2 * | 9/2016 | Kulas | H04N 21/4312 |
| 9,609,260 B2 * | 3/2017 | Kulas | G06Q 30/0601 |
| 9,648,296 B2 | 5/2017 | Kulas | |
| 9,906,829 B2 * | 2/2018 | Kulas | H04N 21/4316 |
| 10,003,781 B2 | 6/2018 | Kulas | |
| 10,187,688 B2 * | 1/2019 | Kulas | H04N 21/4316 |
| 10,575,044 B2 * | 2/2020 | Kulas | H04N 21/4622 |
| 10,979,760 B2 * | 4/2021 | Kulas | H04N 21/4314 |
| 2002/0026343 A1 * | 2/2002 | Duenke | G06Q 30/0283 705/400 |
| 2002/0120935 A1 * | 8/2002 | Huber | H04N 21/812 348/E7.071 |
| 2004/0098754 A1 | 5/2004 | Vella et al. | |
| 2004/0107439 A1 * | 6/2004 | Hassell | H04N 21/4788 725/51 |
| 2004/0143789 A1 * | 7/2004 | Chung | G11B 27/105 715/255 |
| 2004/0189868 A1 | 9/2004 | Molaro et al. | |
| 2005/0018045 A1 * | 1/2005 | Thomas | G06T 15/20 348/E5.022 |
| 2005/0086690 A1 * | 4/2005 | Gilfix | H04N 21/812 348/E5.103 |
| 2005/0132420 A1 * | 6/2005 | Howard | G06F 3/017 348/E5.103 |
| 2005/0234958 A1 | 10/2005 | Sipusic et al. | |
| 2005/0262542 A1 | 11/2005 | DeWeese et al. | |
| 2006/0080337 A1 | 4/2006 | Mita et al. | |
| 2007/0079326 A1 * | 4/2007 | Datta | G06Q 30/0276 725/23 |
| 2008/0008439 A1 * | 1/2008 | Liu | H04N 7/17318 386/290 |
| 2008/0031590 A1 | 2/2008 | Kulas | |
| 2008/0034295 A1 * | 2/2008 | Kulas | G11B 27/005 386/E9.04 |
| 2008/0098425 A1 * | 4/2008 | Welch | H04N 21/478 725/37 |
| 2008/0140523 A1 * | 6/2008 | Mahoney | G11B 27/105 705/26.1 |
| 2008/0184121 A1 | 7/2008 | Kulas | |
| 2008/0285940 A1 * | 11/2008 | Kulas | G11B 27/3027 386/353 |
| 2009/0019487 A1 * | 1/2009 | Kulas | G06F 16/7867 725/41 |
| 2009/0019491 A1 * | 1/2009 | Kulas | H04N 21/4312 725/44 |
| 2009/0024927 A1 * | 1/2009 | Schrock | H04N 21/8193 715/722 |
| 2009/0210778 A1 * | 8/2009 | Kulas | H04N 21/4788 715/201 |
| 2017/0243618 A1 | 8/2017 | Kulas | |
| 2018/0192120 A1 | 7/2018 | Kulas | |
| 2021/0235151 A1 * | 7/2021 | Kulas | H04N 21/47 |
| 2022/0036926 A1 * | 2/2022 | Kulas | H04N 21/8133 |

OTHER PUBLICATIONS

Third party, Alleged invalidity claim chart for U.S. Pat. No. 10,187,688.

\* cited by examiner

MOVING VIDEO TAGS

RELATED APPLICATIONS

This application is a continuation of U.S. patent application Ser. No. 16/799,575 filed on Feb. 24, 2020, entitled "MOVING VIDEO TAGS," now U.S. Pat. No. 10,979,760, which is a continuation of U.S. patent application Ser. No. 16/253,597 filed on Jan. 22, 2019, entitled "MOVING VIDEO TAGS," now U.S. Pat. No. 10,575,044, which is a continuation of U.S. patent application Ser. No. 15/907,095, filed on Feb. 27, 2018, entitled "MOVING VIDEO TAGS," now U.S. Pat. No. 10,187,688, which is a continuation of U.S. patent application Ser. No. 15/269,701, flied on Sep. 19, 2016, entitled "MOVING VIDEO TAGS," now U.S. Pat. No. 9,906,829, which is a continuation of U.S. patent application Ser. No. 12/172,185, filed on Jul. 11, 2008, entitled "MOVING VIDEO TAGS OUTSIDE OF A VIDEO AREA TO CREATE A MENU SYSTEM," now U.S. Pat. No. 9,451,195, which claims priority to U.S. Provisional Patent Application No. 60/949,505, filed on Jul. 12, 2007, entitled "VIDEO TAGS OUTSIDE OF VIDEO AREA." The entire disclosures of all of the foregoing patent applications are hereby incorporated by reference herein.

This application is related to U.S. patent application Ser. No. 11/499,315, filed on Aug. 4, 2006, entitled "DISPLAYING TAGS ASSOCIATED WITH ITEMS IN A VIDEO PLAYBACK," now U.S. Pat. No. 10,003,781, the entire disclosure of which is hereby incorporated by reference herein.

This application is also related to U.S. patent application Ser. No. 11/669,901 filed on Jan. 31, 2007 entitled "AUTHORING TOOL FOR PROVIDING TAGS ASSOCIATED WITH ITEMS IN A VIDEO PLAYBACK," now U.S. Pat. No. 8,656,282, issued on Feb. 18, 2014, the entire disclosure of which is hereby incorporated by reference herein

SUMMARY OF EMBODIMENTS OF THE INVENTION

Tags in a video area are established by displaying the tags with a visual association to an item in the video. Thereafter, the tags move to a tag menu area that is outside of the video area. Tags are selectable, such as by clicking on the tag, to cause additional actions such as displaying a web page related to the tag. Tags move and disappear/appear in conjunction with the video as the video action progresses. In one embodiment, the tag menu area is obtained when a video with a first aspect ratio is displayed in a display area that has a different aspect ratio. The difference in aspect ratios leaves a portion in the display area that is not used for the video that can be used for the tag menu area.

DETAILED DESCRIPTION OF EMBODIMENTS OF THE INVENTION

Figure 2:
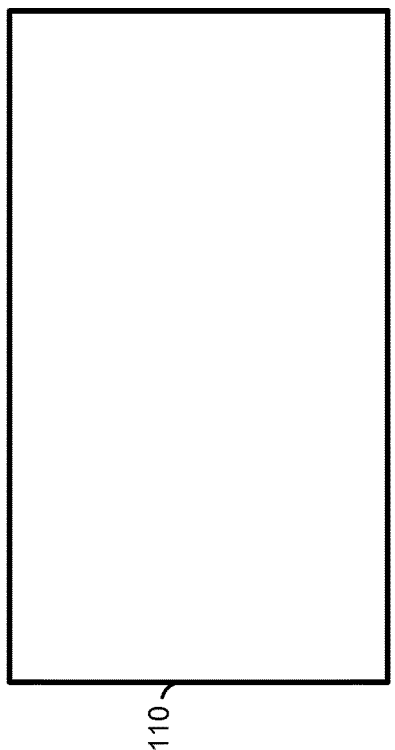
FIG. 2 is a second illustration of a prior art approach to displaying video.
Figure 1:
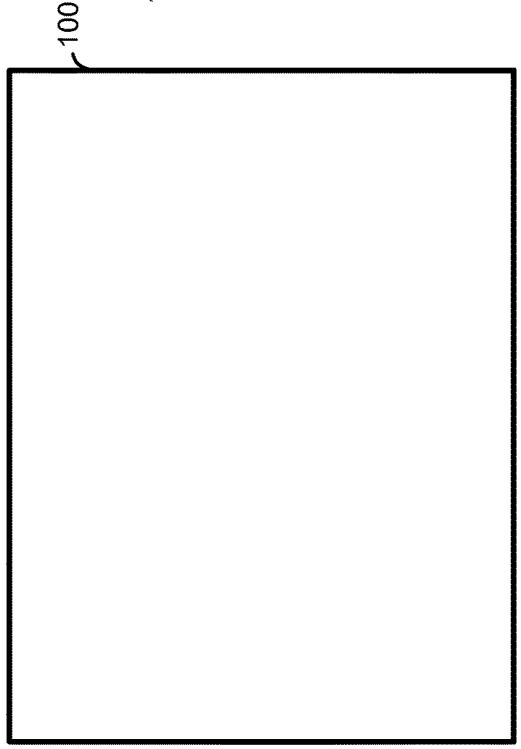
FIG. 1 is a first illustration of a prior art approach to displaying video.

FIGS. 1-4 illustrate prior art approaches to placing a video of a first aspect ratio into a display area of a second aspect ratio. In FIG. 1, video area 100 is a 4:3 aspect ratio such as is commonly used in standard definition (SD) video playback. The ratio 4:3 corresponds to the width divided by the height of the video area. FIG. 2 shows video area 110 which is representative of a 16:9 aspect ratio that is commonly used in high-definition (HD) video formats. Typically, the SD and HD formats are best displayed in a display area that matches the native dimensions of the video aspect ratio. In such cases the full display area (e.g., a television or display screen, predetermined area such as on a web page or computer program, etc.) is filled completely with the video area.

Figure 3:
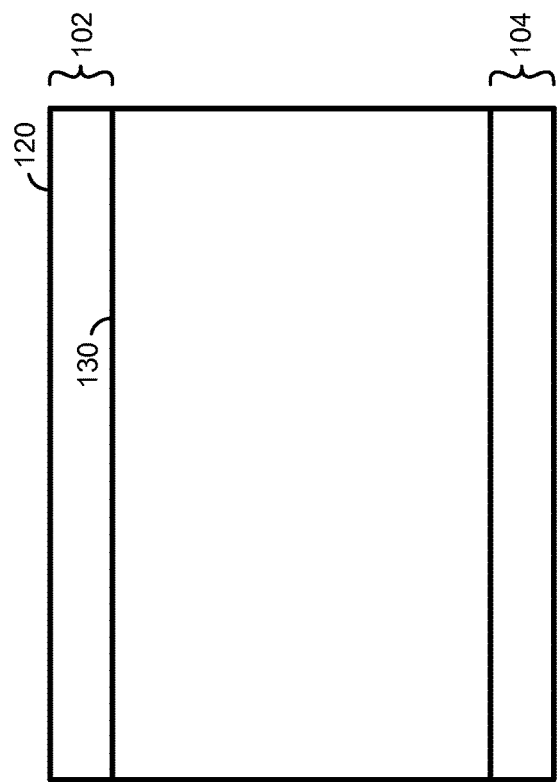
FIG. 3 is a third illustration of a prior art approach to displaying video.

However, in many cases it is undesirable or impossible to change the video display area to exactly match the video aspect ratio. For example, a user may have an SD television and may wish to view an HD program. In such a case, FIG. 3 illustrates a "letterbox" type of solution to the problem. In FIG. 3, an HD display area 120 accommodates HD video program 130 by scaling and vertically centering the HD video area so that it is centered within the SD screen area. This leaves blank or unused areas 102 and 104 at the top and bottom, respectively, of display area 120. These blank areas are typically black or grey and are not used to display video or any other information.

Figure 4:
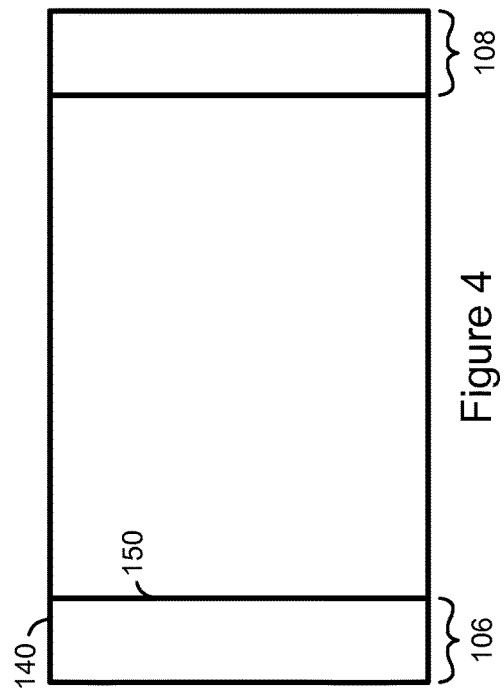
FIG. 4 is a fourth illustration of a prior art approach to displaying video.

Similarly, FIG. 4 illustrates an example where SD video program 150 is displayed within HD display area 140. This leaves blank "pillars" 106 and 108 on the left and right sides, respectively, of the display area.

Figure 6:
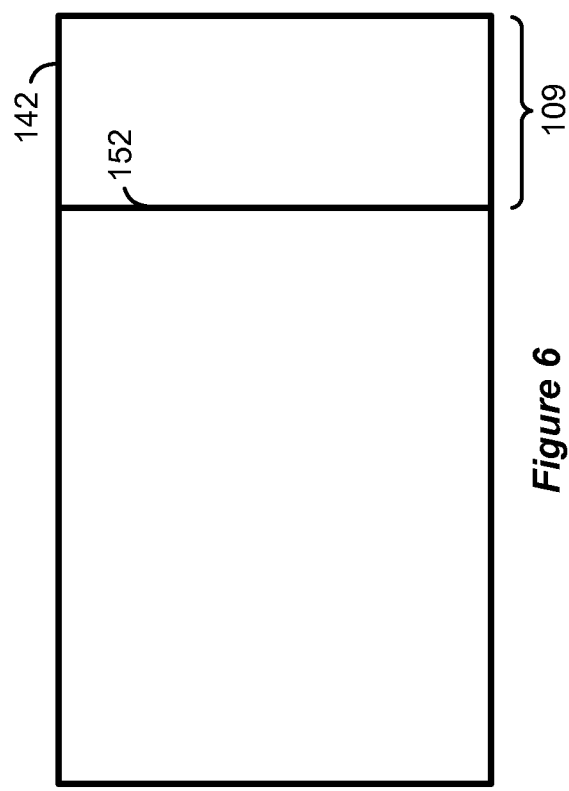
FIG. 6 shows a standard definition format video displayed within a high-definition format video.
Figure 5:
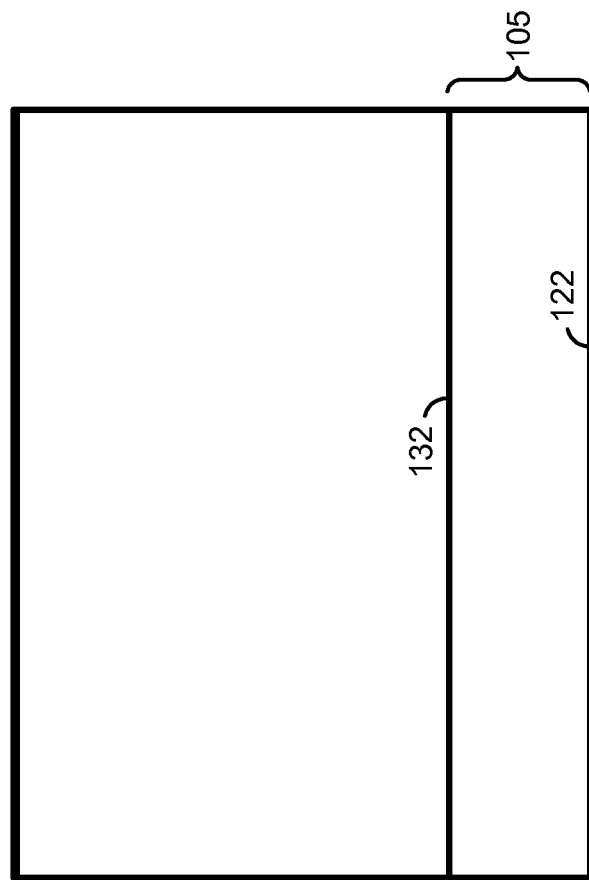
FIG. 5 shows high definition format video displayed within a standard definition area.

FIG. 5 shows an approach according to an embodiment of the present invention where HD format video program 132 is displayed within SD display area 122 so that a lower blank area 105 is maximized. This blank area is advantageously used for display of enhanced or auxiliary information associated with the video program. For example, tags can be displayed in the video and in the blank area as described, below. Similarly, FIG. 6 shows an SD format video 152 displayed within HD area 142 so that a blank area 109 is maximized to the right of the video. This blank area can similarly be used for additional information related to the video or for other purposes. Naturally, the blank areas can be positioned at the top and/or left sides of FIGS. 5 and 6, respectively. The display area can be on a physical display screen, on a portion of a computer display or web page, or the display area can be defined by other means.

Figure 7:
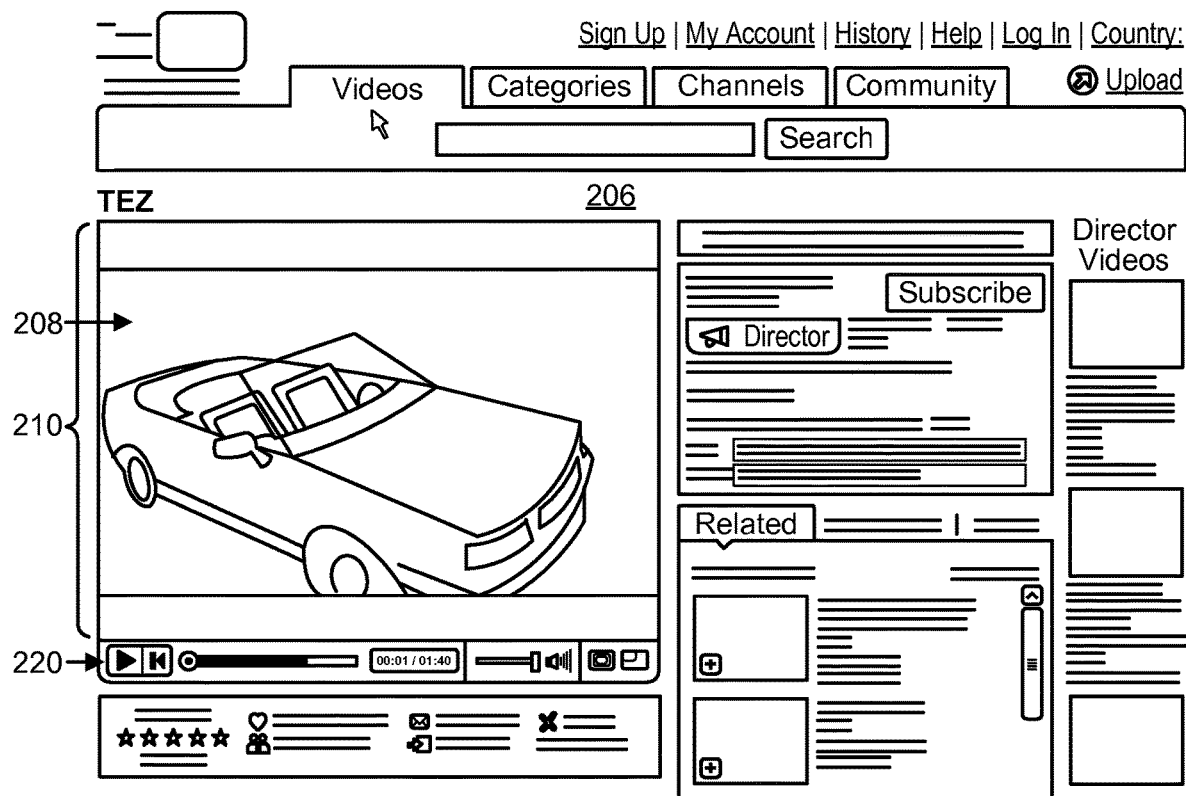
FIG. 7 shows a prior art approach where standard definition video is shown in a standard definition display area.

FIGS. 7-12 illustrate an HD format video displayed within an SD display area on a web page. FIG. 7 shows a prior art approach where SD video 208 is shown in SD display area 210 of web page 206. The web page provides video transport controls at 220 for performing standard control over the video playback such as start, stop, pause, skip to start, move to position, and volume control. Although specific controls are shown, in general any type and design of video playback controls can be provided.

Figure 8:
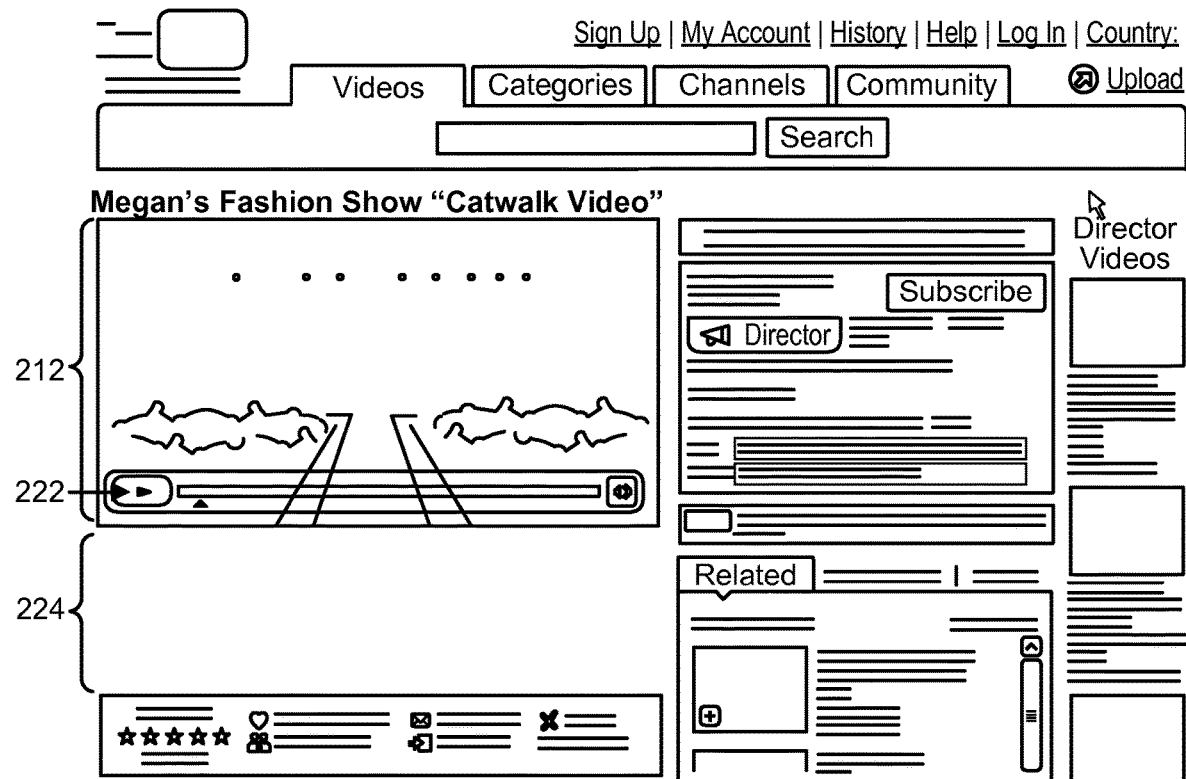
FIG. 8 shows high-definition video in a standard-definition area.

FIG. 8 shows HD format video 212 fit into the upper portion of the SD space on the same web page. This creates blank space 224 which will be used for tag menu items as described below. Transport controls 222 are overlayed onto the video area. However, other embodiments need not overlay the transport controls but may place them in any desirable position, such as in the position of FIG. 7, to the top, left or right sides, not display them at all, etc.

Figure 9:
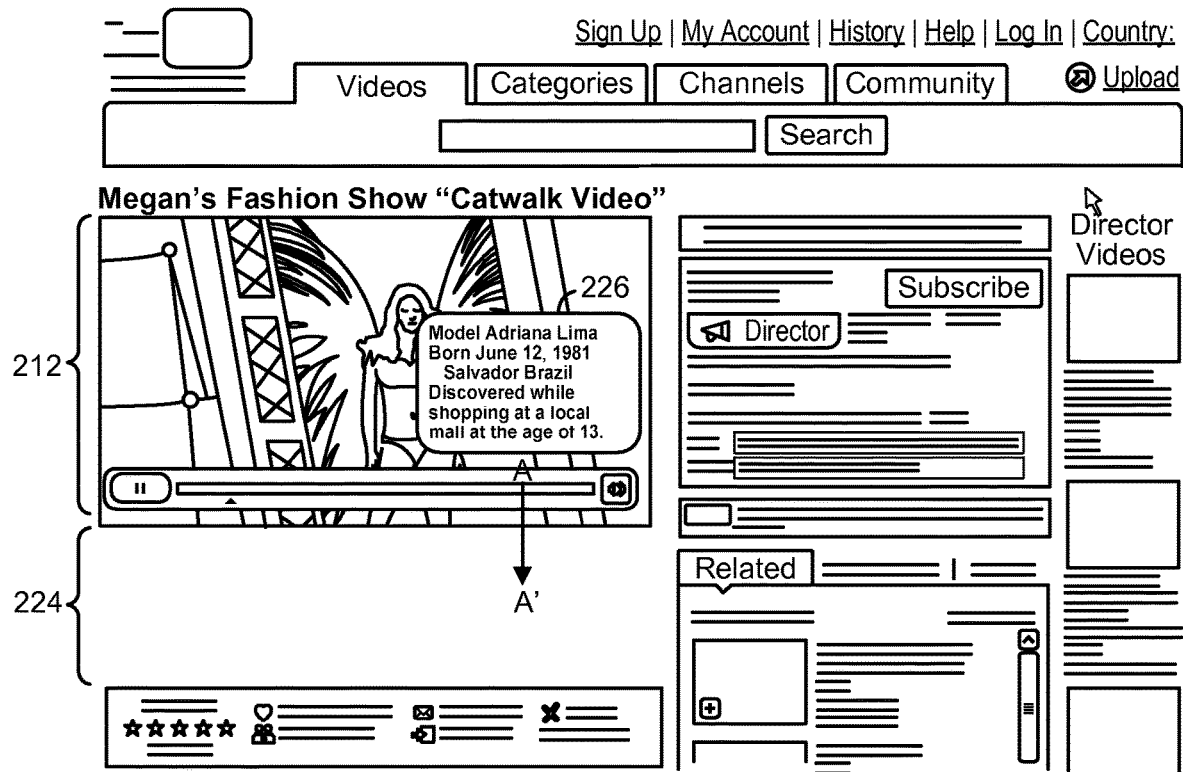
FIG. 9 illustrates video including a tag.

FIG. 9 illustrates video area 212 after the video has started playing back. A video bubble or tag 226 is shown that provides information about the model in the scene. Although specific video subject matter and tag text is shown it should be apparent that the video contents and tag text, design and other tag characteristics can be changed, as desired. As the video plays, the tag moves in the direction A to A' to reside in tag menu area 224.

Figure 10:
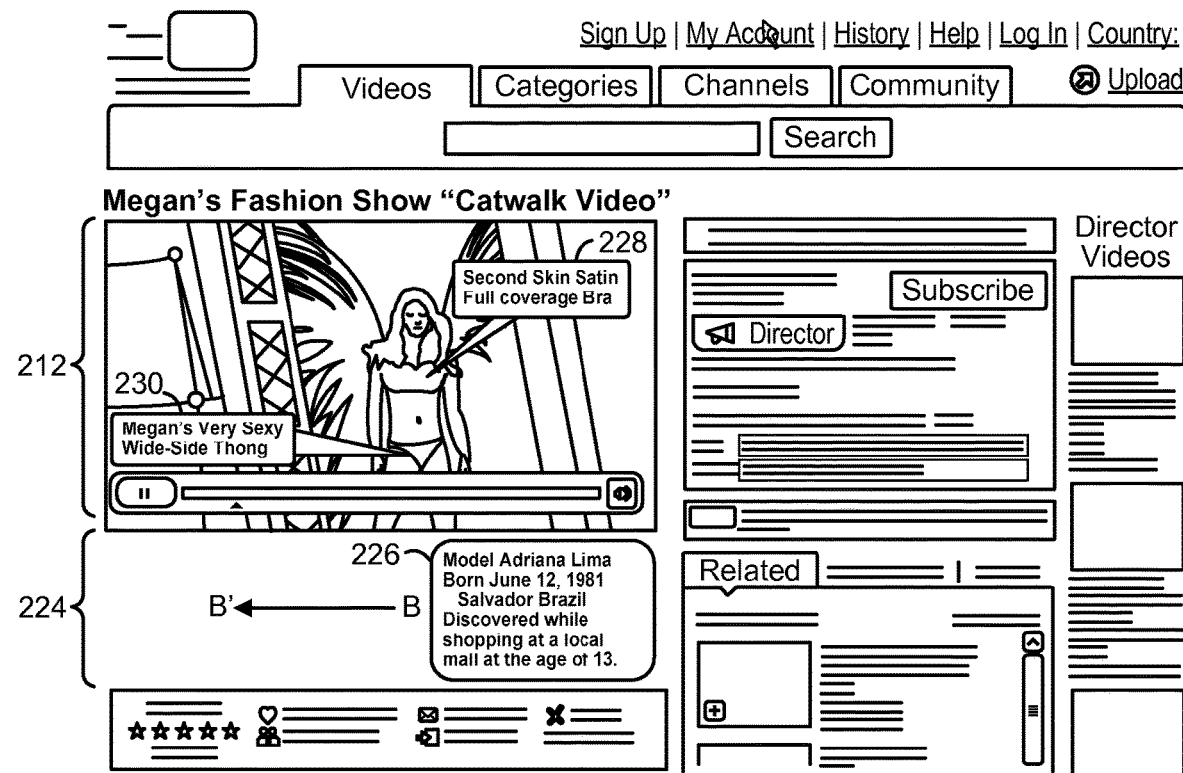
FIG. 10 shows a video after tag movement.

FIG. 10 shows the video display a few seconds later when tag 226 has moved into the tag menu area 224. Additional tags 228 and 230 have appeared in video area 212 to describe garments that the model is wearing. Visual pointers from tags 228 and 230 serve to associate each tag with its respective garment item. Tag 226 will next move along the direction B to B' while tags 228 and 230 will each move to the tag menu area.

Figure 11:
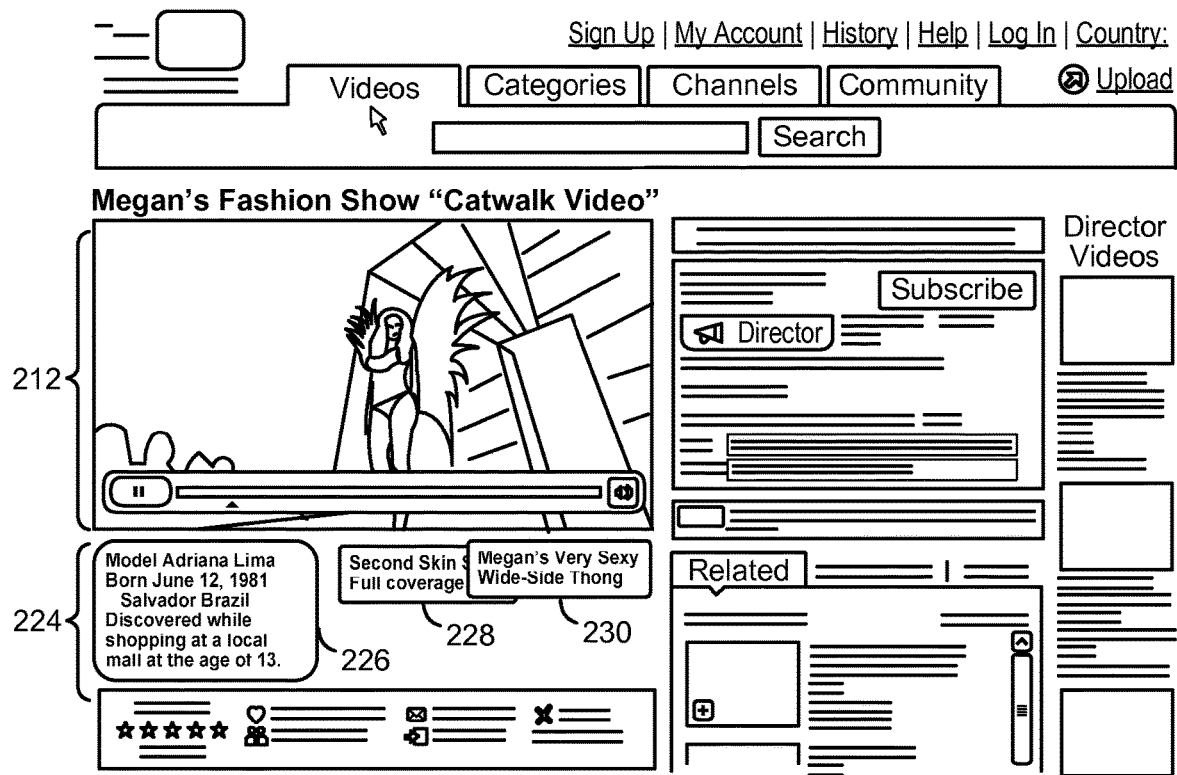
FIG. 11 shows a video after additional tag movement.
Figure 12:
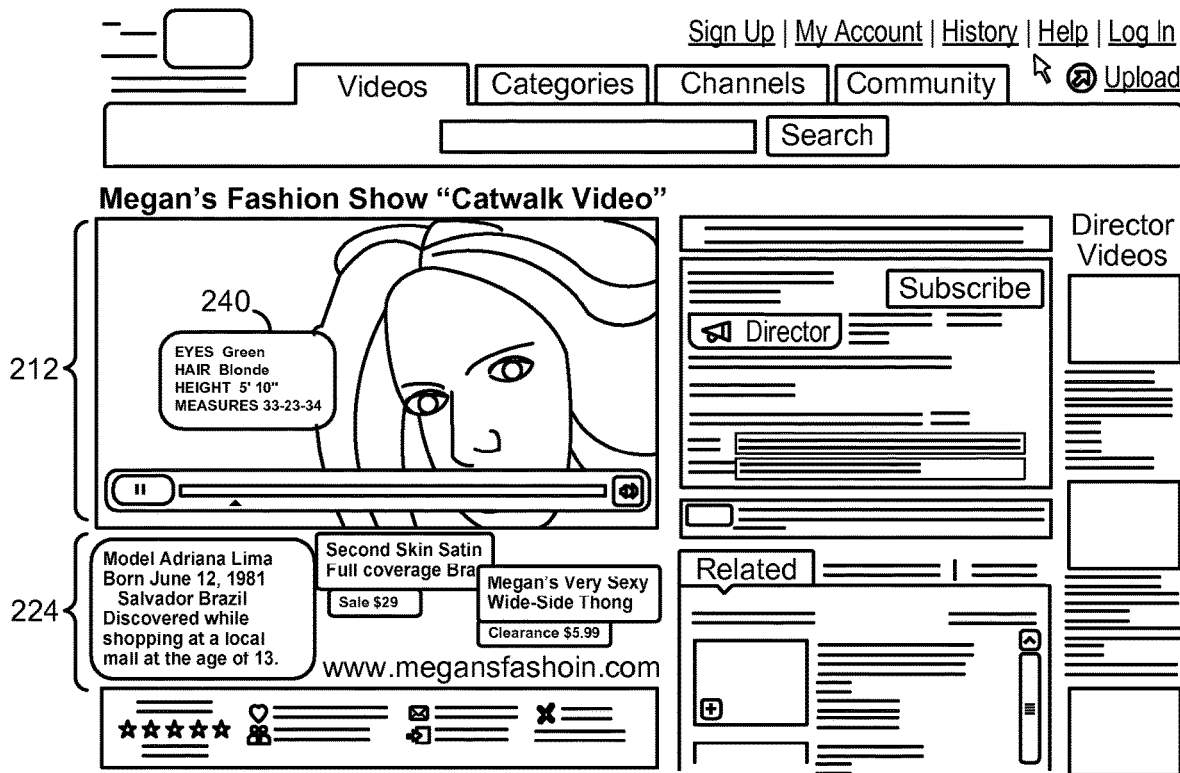
FIG. 12 shows tags reaching their final positions.

FIG. 11 shows tag 226 positioned at the left side of tag menu area 224 while tags 228 and 230 have moved to the tag menu area (and are still in motion moving sideways to create more separation between them). FIG. 12 illustrates a point in time where the tags have reached their final positions and additional information, such as price information and website address information is also displayed into the tag menu area. A new tag 240 has appeared to provide more information about the model. In this manner, any number and type of tag can be presented in association with an item in the video (or in the abstract) and can then be moved to the tag menu area. Each tag can be "clickable" so that, upon selection by a user, additional information related to the tag, such as a web page, is displayed. Other functionality may be provided to the tags—such as allowing a tag to expand to provide additional information, opening an adjacent window or frame next to the video playback to provide additional information or functionality, etc. Although specific content has been used in this example, it should be apparent that any other content can be used for the video and/or the tags.

Many other types of hardware and software platforms can be used to implement the functionality described herein. For example, a video player can be included in a portable device such as a laptop, PDA, cell phone, game console, e-mail device, etc. The tag data can reside on a storage device, server, or other device that is accessed over another network. In general, the functions described can be performed by any one or more devices, processes, subsystems, or components, at the same or different times, executing at one or more locations.

Accordingly, particular embodiments can provide for computer playback of video that supports automatically capturing of screen snapshots, in the accommodation of tag information outside of a video play area. Further, while particular examples have been described herein, other structures, arrangements, and/or approaches can be utilized in particular embodiments.

Any suitable programming language can be used to implement features of the present invention including, e.g., C, C++, Java, PUI, assembly language, etc. Different programming techniques can be employed such as procedural or object oriented. The routines can execute on a single processing device or multiple processors. The order of operations described herein can be changed. Multiple steps can be performed at the same time. The flowchart sequence can be interrupted. The routines can operate in an operating system environment or as stand-alone routines occupying all, or a substantial part, of the system processing.

Steps can be performed by hardware or software, as desired. Note that steps can be added to, taken from or modified from the steps in the flowcharts presented in this specification without deviating from the scope of the invention. In general, the flowcharts are only used to indicate one possible sequence of basic operations to achieve a function.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment," "an embodiment," "a particular embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," "in a particular embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Further, distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

The invention claimed is:

1. A method comprising:
causing a display device to display a video depicting an item at an item position in a scene;
causing the display deevice to display a tag in a first position on a first frame of the video, the tag being associated with and distinct and separated away from the item depicted in the video, wherein the tag includes text information associated with the item depicted in the video, and wherein the tag is surrounded by a visually perceptible border defining a tag area;
causing the display device to display the tag in a second position on a second frame of the video;
causing the display device to display the tag in intermediate positions between the first and second positions during frames between the first and second frames of the video, wherein each of the first position, the second position, and the intermediate positions is different from the item position;
receiving from an input device a selection of the tag; and
in response to receiving from the input device the selection of the tag, performing a predetermined action to provide additional information relating to the item in the video, wherein the step of performing the predetermined action to provide the additional information relating to the item depicted in the video comprises causing the display device to expand the tag area so that the additional information can be presented within the tag area along with descriptive information describing the item depicted in the video.

2. The method of claim 1, further comprising:
causing the display device to display a visually perceptible indicator extending between a proximity of the item position in the first frame of the video and a proximity of the first position.

3. The method of claim 2, further comprising:
causing the display device to display the visually perceptible indicator extending between a proximity of the item position in the second frame of the video and a proximity of the second position.

4. The method of claim 3, further comprising:
causing the display device to display the visually perceptible indicator extending between a proximity of the item position in the intermediate frames of the video and proximities of the intermediate positions.

5. The method of claim 1, wherein the video also depicts a second item, the method further comprising:
causing the display device to display a second tag in a first second tag position on a first frame of the video, the second tag being associated with the second item depicted in the video, wherein the second tag includes text information associated with the second item depicted in the video;
causing the display device to display the second tag in a second second tag position on a second frame of the video; and
causing the display device to display the second tag in intermediate positions between the first second tag position and the second second tag positions during frames between the first and second frames of the video.

6. The method of claim 1, wherein the step of performing the predetermined action to provide the additional information relating to the item in the video comprises causing the display device to present a web page including the additional information relating to the item.

7. The method of claim 1, wherein the step of performing the predetermined action to provide the additional information relating to the item depicted in the video comprises causing the display device to display a new window and causing the display device to present in the new window the additional information relating to the item.

8. The method of claim 2, wherein the visually perceptible indicator is a lead line.

9. An apparatus for use with a display device, the apparatus comprising:
a hardware processor; and
a memory storing instructions that configure the hardware processor to:
cause the display device to display a video depicting an item at an item position in a scene;
cause the display device to display a tag in a first position on a first frame of the video, the tag being associated with and distinct and separated away from the item depicted in the video, wherein the tag includes text information associated with the item depicted in the video, and wherein the tag is surrounded by a visually perceptible border defining a tag area;
cause the display device to display the tag in a second position on a second frame of the video;
cause the display device to display the tag in intermediate positions between the first and second positions during frames between the first and second frames of the video, wherein each of the first position, the second position, and the intermediate positions is different from the item position; and
in response to receiving from an input device a selection of the tag, cause the display device to expand the tag area so that the additional information can be presented within the tag area along with descriptive information describing the item depicted in the video.

10. The apparatus of claim 9, wherein the memory further stores instructions that configure the hardware processor to cause the display device to simultaneously display at least the following with the video and the tag:
a visually perceptible indicator extending between a proximity of the item position in the first frame of the video and a proximity of the first position.

11. The apparatus of claim 9, wherein the video also depicts a second item, the memory further stores instructions that configure the hardware processor to:
cause the display device to display a second tag in a first second tag position on a first frame of the video, the second tag being associated with the second item depicted in the video, wherein the second tag includes text information associated with the second item depicted in the video;
cause the video display to display the second tag in a second second tag position on a second frame of the video; and
cause the display device to display the second tag in intermediate positions between the first second tag and the second second tag positions during frames between the first and second frames of the video.

12. The apparatus of claim 9, wherein the memory further stores instructions that configure the hardware processor to perform a predetermined action to provide additional information relating to the item in the video in response to a signal denoting a selection of the tag by a user using an input device operatively connected to the hardware processor.

13. The apparatus of claim 12, wherein the predetermined action comprises causing the display device to present a web page including the additional information relating to the item.

14. The apparatus of claim 10, wherein the visually perceptible indicator is a lead line.

15. A non-transitory computer-readable medium having instructions stored thereon, the instructions comprising:
instructions to cause a display device to display a video depicting an item at an item position in a scene;
instructions to cause the display device to display a tag in a first position on a first frame of the video, the tag being associated with and distinct and separated away from the item depicted in the video, wherein the tag includes text information associated with the item depicted in the video, and wherein the tag is surrounded by a visually perceptible border defining a tag area;
instructions to cause the display device to display the tag in a second position on a second frame of the video;
instructions to cause the display device to display the tag in intermediate positions between the first and second positions during frames between the first and second frames of the video, wherein each of the first position, the second position, and the intermediate positions is different from the item position; and
instructions to cause, in response to receiving from an input device a selection of the tag, the display device to expand the tag area so that the additional information can be presented within the tag area along with descriptive information describing the item depicted in the video.

16. The non-transitory computer-readable medium of claim 15, further comprising:
instructions to cause the display device to simultaneously display the following with the video and the tag:
a visually perceptible indicator extending between a proximity of the item position in the first frame of the video and a proximity of the first position;
a visually perceptible indicator extending between a proximity where the item is depicted in the second frame of the video and a proximity of the second position; and
a visually perceptible indicator extending between a proximity where the item is depicted in the intermediate frames of the video and proximities of the intermediate positions.

17. The non-transitory computer-readable medium of claim 15, wherein the video also depicts a second item, the computer-readable medium further comprising:
instructions to cause the display device to display a second tag in a first second tag position on a first frame of the video, the second tag being associated with the second item depicted in the video, wherein the second tag includes text information associated with the second item depicted in the video;
instructions to cause the display device to display the second tag in a second second tag position on a second frame of the video; and
instructions to cause the display device to display the second tag in intermediate positions between the first second tag and the second second tag positions during frames between the first and second frames of the video.

18. The non-transitory computer-readable medium of claim 15, wherein the visually perceptible indicator is a lead line.

* * * * *